United States Patent Office 3,203,950
Patented Aug. 31, 1965

3,203,950
SELECTED AZETIDINES AND THEIR PREPARATION

Harris D. Hartzler, Wilmington, Del., assignor to E. I. du Pont de Nemours and Company, Wilmington, Del., a corporation of Delaware No Drawing. Filed Jan. 8, 1963, Ser. No. 250,017
20 Claims. (Cl. 260—239)

This invention relates to, and has as its principal objects provision of, a novel class of azetidines and the preparation of the same.

The novel products of this invention are azetidines having the general formula:

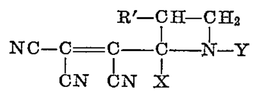

wherein X is chlorine or bromine, Y is hydrogen or SR, where R is a polyhaloalkyl group, and R′ is an electron-donating group, i.e., a group which has a negative Hammett substituent constant, $\sigma$. For a discussion of this Hammett $\sigma$ value, see Hine's "Physical Organic Chemistry," McGraw-Hill, 1956, pp. 71–72, and Jaffe, Chem. Rev. 53, 191 (1953). The preferred electron-donating groups in the products of this invention are alkoxy, alkenyloxy, aryl, alkoxyaryl, alkylthio, acetyloxy and 2-oxopyrrolidyl. The azetidines of the above formula in which the R and R′ groups contain up to 10 carbon atoms form an especially preferred group of products since the starting materials from which they are prepared are more readily accessible.

The products of the above formula in which Y is a polyhaloalkylthio group are prepared by the reaction of a 2-halo-3,4,4-tricyano-1-polyhaloalkylthio-1-aza-1,3-butadiene of the general formula

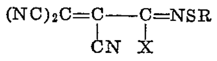

wherein X and R have the meanings defined above, with an electron-rich olefin, i.e., an olefin of the formula $R'CH{=}CH_2$, wherein R′ is an electron-donating group (as defined above), optionally in the presence of an aprotic solvent. By aprotic solvent is meant one which does not have a tendency to release or accept protons (cf. Moeller's "Inorganic Chemistry," John Wiley & Sons, Inc., New York, 1952, p. 312). Reaction takes place between equimolar amounts of the two reactants as shown by the following equation:

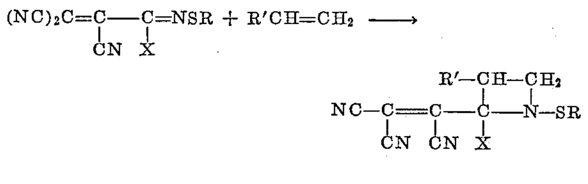

The temperature at which reaction takes place is not critical. Temperatures ranging from 0° C. or lower up to 150° C. or higher can be employed. Since reaction with the most reactive reactants is exothermic, it is convenient to mix the reactants at room temperature or lower in an aprotic solvent that boils at a moderately elevated temperature, e.g., 35–100° C., and allow the reaction to proceed until the evolution of heat ceases. In the case of reactants of lower reactivity, it is convenient to heat the reaction mixture to a temperature of 40–100° C. for several hours, e.g., up to 24 hours or more, to carry the reaction to completion.

As indicated above, reaction takes place between equimolar amounts of the two reactants. An excess of the olefinic reactant, however, can be used if desired, the excess serving as reaction medium.

Any aprotic solvent that is a solvent for the reactants at the operating temperature can be used as reaction medium. Suitable aprotic solvents include ethers, e.g., diethyl ether, ethylene glycol dimethyl ether, and dioxane; nitriles, e.g., acetonitrile; aromatic hydrocarbons, e.g., benzene and toluene; aliphatic hydrocarbons, e.g., warm hexane; and halogenated hydrocarbons, e.g., chlorobenzene. The proportions of the solvents can vary widely. Amounts ranging up to 200 times the amount of reactants give satisfactory results. A reactant may serve as a solvent, e.g., a liquid vinyl ether, and in this case no added aprotic solvent is required.

The products can be isolated from the reaction mixture by conventional means. For example, the solvent can be removed by evaporation or distillation at atmospheric or reduced pressures and the crude azetidine can be purified, if desired, by recrystallization from a suitable solvent, e.g., a mixture of benzene and hexane.

The 2-halo-3,4,4-tricyano-1-polyhaloalkylthio-1-aza-1,3-butadiene starting materials can be prepared by reaction of tetracyanoethylene with a polyhalogenated aliphatic hydrocarbonsulfenyl chloride or bromide in an aprotic solvent having a dielectric constant of at least 4 under anhydrous conditions at a temperature of 0° or lower up to 100° C., optionally in the presence of chloride or bromide ions as catalysts. This process is described in greater detail in my U.S. application Serial No. 224,841, filed September 19, 1962. The electron-rich olefins used in this process are known compounds preparable by known methods.

The products of the general formula in which Y is hydrogen can be prepared by reaction of azetidines of the above general formula in which Y is SR, i.e., azetidines of the formula

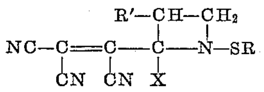

with a nucleophile, e.g., an alcohol or an amine, in an inert solvent such as an ether, e.g., diethyl ether or ethylene glycol methyl ether. A nucleophile is a reagent which, when entering a chemical reaction and forming a new chemical bond, acts by donating or sharing its electrons (see Patai's "Glossary of Organic Chemistry," Interscience Publishers, Inc., New York, 1962, p. 144). Reaction takes place with removal of the polyhaloalkylthio group. This reaction takes place slowly at moderately elevated temperatures. Reaction times ranging from a few hours, e.g., 2–4 hours, up to several days, e.g., 2 days or more, at temperatures of 40–65° C. are satisfactory. The reaction is conveniently carried out at the reflux temperature of the reaction mixture. At the completion of the reaction, the solvent can be removed by evaporation or distillation and the residual solid azetidine can be purified by recrystallization from a solvent such as ethylene dichloride.

The products of the above general formula where Y is hydrogen are quite stable. They undergo no reaction with refluxing methanol, hot ethylenic silver nitrate, zinc dust in ethanol or dimethyl aniline in methanol. No reaction occurs with pyridine or potassium hydroxide at room temperature.

In some cases the products of this invention in which Y is hydrogen are obtained alone or in combination with products in which Y is SR in the reaction of an electron-rich olefin with a 2-halo-3,4,4-tricyano-1-polyhaloalkylthio-1-aza-1,3-butadiene. This presumably is due to the adventitious presence of a nucleophile in the reaction system. Consequently, when the polyfluoroalkylthio-substituted azetidine is desired, care should be taken that no nucleophilic reagent be present in the reaction system.

The reaction is illustrated in further detail by the following examples in which the proportions of ingredients are expressed in parts by weight unless otherwise noted.

EXAMPLE 1

*Preparation of 2-chloro-3-ethoxy-2-tricyanovinyl-1-trifluoromethylthioazetidine*

A solution of 1.4 g. of ethyl vinyl ether in 5 ml. of diethyl ether is added to a solution of 2.65 g. of 2-chloro-3,4,4-tricyano-1-trifluoromethylthio - 1-aza-1,3-butadiene in 15 ml. of diethyl ether at 25° C. After 2 minutes, heat is evolved and the mixture warms to reflux. Heat evolution subsides after 5 minutes. The ether is removed under a stream of nitrogen and the residual oil is crystallized from a heptane-benzene (3:1) mixture. There is obtained 2.58 g. of the adduct melting at 104–107° C. Recrystallization from heptane gives 1.43 g. of pure 2-chloro-3-ethoxy - 2 - tricyanovinyl-1-trifluoromethylthioazetidine.

*Analysis.*—Calc'd for $C_{11}H_8ON_4SF_3Cl$: C, 39.23%; H, 2.40%; N, 16.64%; Cl, 10.54%; F, 16.92%. Found: C, 38.93%; H, 2.45%; N, 16.21%; Cl, 10.98%; F, 17.00%.

The infrared absorption spectrum of the product is completely consistent with the assigned structure. It shows absorption due to conjugated nitrile at 4.49 microns, tricyanovinyl double bond at 6.31 microns and carbon-fluorine bond at 8–10 microns. The ultraviolet absorption spectrum of the product confirms the presence of the tricyanovinyl group by showing absorption at 260 millimicrons ($\epsilon$=16,300).

The nuclear magnetic resonance spectrum of the adduct obtained in deuteriochloroform solution is also consistent with the assigned structure. The methyl group appears as a triplet centered at $\tau$=8.75. The methylene of the ethyl group is a quartet centered at $\tau$=6.32. The methine hydrogen is split into four peaks centered at $\tau$=4.75. The ring methylene hydrogens appear as a weak, strong, strong, weak pattern split into doublets and centered at $\tau$=7.3.

When the procedure of Example 1 is repeated with the exception that the diethyl ether reaction medium of that example is replaced by 16 g. of acetonitrile, there is obtained after a 10 minute reaction 2.22 g. of 2-chloro-3-ethoxy - 2 - tricyanovinyl - 1-trifluoromethylthioazetidine melting at 98-104° C. This product is identical in all respects with the product of Example 1.

EXAMPLE 2

*Preparation of 2-chloro-3-p-methoxyphenyl-2-tricyanovinyl-1-trifluoromethylthioazetidine*

A solution of 10.8 g. (0.4 mole) of 2-chloro-3,4,4-tricyano-1-trifluoromethylthio-1-aza-1,3-butadiene in 70 ml. of diethyl ether is stirred at 0° C. under a blanket of nitrogen. A 45% solution of p-methoxystyrene in chlorobenzene (12 g., 0.04 mole) is added and a deep purple solution forms. The color disappears as the solution warms to room temperature and a white precipitate separates. The amount of white precipitate is removed by filtration, and hexane (50 ml.) is added to the filtrate. The crystals which form after stirring overnight are filtered out, and there is obtained 13.91 g. of crude adduct, melting at 125–131° C. Recrystallization from benzene-hexane (1:1) gives pure 2-chloro-3-p-methoxyphenyl-2-tricyanovinyl-1-trifluoromethylthioazetidine, M.P. 132.8–133.6° C.

*Analysis.*—Calc'd for $C_{16}H_{10}ON_4ClSF_3$: C, 48.18%; H, 2.54%; N, 14.05%; Cl, 8.89%; F, 14.30%. Found: C, 48.05%; H, 2.65%; N, 13.72%; Cl, 8.90%; F, 14.35%.

The infrared absorption spectrum of this product shows absorption due to saturated CH at 3.37 and 3.51 microns, nitrile at 4.5 microns, strong tricyanovinyl double bond at 6.35 microns, CF at 8–9 microns and $SCF_3$ at 13.26 microns. Both the intensity of the nitrile absorption and the strength of the conjugated double bond absorption at 6.35 microns suggest the presence of the tricyanovinyl group. Additional evidence of this is derived from the ultraviolet absorption spectrum of the product obtained in acetonitrile solution. There are absorptions at $\lambda_{max.}$ 230 millimicrons ($\epsilon$=15,000) and $\lambda_{max.}$ 268 millimicrons ($\epsilon$=18,300). These absorptions are attributed to the p-methoxyphenyl group and the tricyanovinyl group, respectively. Both are slightly increased in intensity. This suggests a close spatial arrangement of the two groups and suggests they are cis to each other.

EXAMPLE 3

*Preparation of 2-chloro-2-tricyanovinyl-1-trifluoromethylthio-3-vinyloxyazetidine*

A slurry of 12.4 g. of 2-chloro-3,4,4-tricyano-1-trifluoromethylthio-1-aza-1,3-butadiene in 70 ml. of diethyl ether with 10 ml. of divinyl ether is stirred at room temperature for 24 hours. During this period a precipitate forms. Removal of the precipitate by filtration gives 11.54 g. of the crude adduct (74% of theory) melting at 119–123° C. Recrystallization from hexane-benzene (2:1) gives 2 - chloro-2-tricyanovinyl-1-trifluoromethylthio-3-vinyloxyazetidine, M.P. 132.8–134° C.

*Analysis.*—Calc'd for $C_{11}H_6N_4OSClF_3$: C, 39.47%; H, 1.81%; N, 16.74%; Cl, 10.59%. Found: C, 39.96%; H, 2.11%; N, 16.74%; Cl, 10.45%.

The infrared absorption spectrum of this product shows absorption at 3.37 and 3.38 microns (saturated CH), 4.51 microns (conjugated C≡N), 6.09 microns (non-conjugated C=C), 6.29 microns (conjugated C=C), 8–9 microns (C—F) and 13.27 microns (probably due to $CF_3$—S).

EXAMPLE 4

*Preparation of 3-butoxy-2-chloro-2-tricyanovinyl-1-trifluoromethylthioazetidine*

A solution of 5.26 g. (0.02 mole) of 2-chloro-3,4,4-tricyano-1-trifluoromethylthio-1-aza-1,3-butadiene in 50 ml. of diethyl ether is stirred while a solution of 4.0 g. (0.04 mole) of butyl vinyl ether in 10 ml. of diethyl ether is added. The solution turns dark and a mildly exothermic reaction ensues. After 30 minutes the reaction mixture is cooled in ice. No precipitate separates. The solvent is removed under nitrogen and the residual oil is crystallized by the additon of 20 ml. of hexane. The crude adduct obtained by filtration amounts to 6.47 g., M.P. 84.6–87° C. Recrystallization of the adduct from hexane gives pure 3-butoxy-2-chloro-2-tricyanovinyl-1-trifluoromethylthioazetidine, M.P. 106–106.6° C.

*Analysis.*—Calc'd for $C_{13}H_{12}N_4OSF_3Cl$: C, 42.80%; H, 3.31%; N, 15.36%. Found: C, 42.92%; H, 3.46%; N, 15.50%.

The infrared absorption spectrum of the product shows strong nitrile absorption at 4.49 microns and intense tricyanovinyl double bond absorption at 6.29 microns. The spectrum is completely consistent with the azetidine structure. The ultraviolet absorption spectrum of the adduct in acetonitrile solution shows absorption at $\lambda_{max.}$ 261 millimicrons ($\epsilon$=16,200). This is the absorption of tricyanovinyl group.

EXAMPLE 5

*Preparation of 2-chloro-3-phenyl-2-tricyanovinyl-1-trifluoromethylthioazetidine*

A solution of 2.70 g. of 2-chloro-3,4,4-tricyano-1-trifluoromethylthio-1-aza-1,3-butadiene and 2.10 g. of styrene in 25 ml. of diethyl ether is stirred at room temperature. The red color of the $\pi$-complex between the reactants forms upon mixing. The mixture is warmed overnight at 40° C. The reaction mixture is cooled and the solvent is removed under a stream of nitrogen. Addition of 20 ml. of pentane causes the residue to crystallize. Filtration gives 3.56 g. of light tan solid. Recrystallization from hexane gives 2-chloro-3-phenyl-2-tricyanovinyl-1-trifluoromethylthioazetidine, M.P. 115–117° C.

*Analysis.*—Calc'd for $C_{15}H_8N_4SF_3Cl$: C, 48.85%; H, 2.20%; N, 15.19%; S, 8.69%. Found: C, 48.37%; H, 2.19%; N, 15.46%; S, 8.35%.

The infrared absorption spectrum of the product shows the intense tricyanovinyl absorption at 6.34 microns and a nitrile absorption at 4.5 microns. The spectrum is completely consistent with the azetidine structure. The ultraviolet absorption spectrum of the product in acetonitrile solution shows the presence of the tricyanovinyl group, $\lambda_{max.}$ 268 millimicrons ($\epsilon$=16,400). When the adduct is dissolved in benzene, the red color of the $\pi$-complex of 2-chloro-3,4,4-tricyano-1-trifluoromethylthio-1-aza-1,3-butadiene and styrene develops due to the dissociation of the adduct into its components.

EXAMPLE 6

*Preparation of 2-chloro-3-methoxy-2-tricyanovinyl-1-trifluoromethylthioazetidine*

A solution of 27 g. of 2-chloro-3,4,4-tricyano-1-trifluoromethylthio-1-aza-1,3-butadiene and 10 g. of methyl vinyl ether in 200 ml. of diethyl ether is stirred at room temperature. After a few minutes an exothermic reaction ensues and a solid precipitates. The mixture is stirred overnight and then filtered. There is obtained 29.5 g. of crude adduct melting at 132–137.6° C. Recrystallization of this product from hexane-benzene (3:1) gives white, solid 2-chloro-3-methoxy-2-tricyanovinyl-1-trifluoromethylthioazetidine, M.P. 139–140° C.

*Analysis.*—Calc'd for $C_{10}H_6N_4OClSF_3$: C, 37.22%; H, 1.87%; N, 17.37%; Cl, 10.99%. Found: C, 38.42%; H, 2.19%; N, 16.89%; Cl, 11.60%.

The infrared absorption spectrum of this product shows absorptions at 3.32, 3.37, 3.41 and 3.52 microns (saturated CH), 4.51 microns (conjugated nitrile), 6.29 microns (conjugated C=C), 8–10 microns (C—F), and 13.27 microns (S—$CF_3$). The ultraviolet absorption spectrum of the product in acetonitrile solution shows the absorption of the tricyanovinyl chromophore at 260 millimicrons ($\epsilon$=15,900).

EXAMPLE 7

*Preparation of 2-chloro-3-p-methoxyphenyl-2-tricyanovinylazetidine*

A solution of 4.0 g. (0.01 mole) of 2-chloro-3-p-methoxyphenyl-2-tricyanovinyl-1-trifluoromethylthioazetidine in 10 ml. of ethylene glycol dimethyl ether with 0.47 g. (0.01 mole) of absolute ethanol is heated at 65° C. for 16 hours. The solvent is evaporated under nitrogen and the residue is crystallized by trituration with ether. A mixture of starting trifluoromethylthioazetidine and 2-chloro-3-p-methoxyphenyl-2-tricyanovinylazetidine amounting to 3.63 g. is isolated by filtration. Trituration of the mixture with 5 ml. of methyl ethyl ketone leaves 0.64 g. of 2-chloro-3-p-methoxyphenyl-2-tricyanovinylazetidine as an insoluble white solid, M.P. 252–256° C. (dec.). Unchanged starting material (2.7 g., 69%) is obtained by evaporation of the filtrate.

EXAMPLE 8

*Preparation of 2-chloro-3-methoxy-2-tricyanovinylazetidine*

A solution of 16.2 g. of 2-chloro-3-methoxy-2-tricyanovinyl-1-trifluoromethylthioazetidine and 4.6 g. of ethanol in 50 ml. of ethylene glycol dimethyl ether is heated at reflux under a nitrogen atmosphere for 2 days. The solvent is then removed from the reaction mixture under nitrogen. The residue is triturated with diethyl ether and the residue is filtered out. There is obtained 7.09 g. (64% of theory) of 2-chloro-3-methoxy-2-tricyanovinylazetidine, M.P. 159.4–161.4° C. Recrystallization from methanol gives pure product, M.P. 166–167.4° C.

*Analysis.*—Calc'd for $C_9H_7ON_4Cl$: C, 48.55%; H, 3.17%; N, 25.17%; Cl, 15.92%. Found: C, 48.80%; H, 3.27%; N, 25.33%; Cl, 15.89%.

The infrared absorption spectrum of this product is consistent with the assigned structure. In particular, the absorptions due to NH, $CH_3O$ and tricyanovinyl are seen while those of C—F and $CF_3S$ are absent. The ultraviolet absorption spectrum of this product in acetonitrile shows the tricyanovinyl group at 261 millimicrons ($\epsilon$=16,100).

EXAMPLE 9

*Preparation of 2-chloro-3-p-methoxyphenyl-2-tricyanovinylazetidine*

A slurry of 2.0 g. of 2-chloro-3-p-methoxyphenyl-2-tricyanovinyl-1-trifluoromethylthioazetidine in 20 ml. of diethyl ether is stirred at 25° C. Pyridine (4 g.) is added and then 35 g. of ethylene glycol dimethyl ether is added to give a homogeneous solution. The resulting solution is heated at 40° C. for 4 hours, during which time a precipitate begins to separate. The solvent is removed under a stream of nitrogen and there is obtained a residue of 14.4 g. of crude 2-chloro-3-p-methoxyphenyl-2-tricyanovinylazetidine melting at 232–244° C. (dec.). Recrystallization of the residue from ethylene chloride gives a product having a M.P. of 255–257° C. (dec.). This product has an infrared absorption spectrum identical to that of 2-chloro-3-p-methoxyphenyl-2-tricyanovinylazetidine prepared as described in Example 7.

EXAMPLE 10

*Preparation of 2-chloro-3-ethoxy-2-tricyanovinylazetidine*

The dissolving of 2-chloro-3-ethoxy-2-tricyanovinyl-1-trifluoromethylthioazetidine in technical grade dibutyl ether at 100° C. results in extensive decomposition of this azetidine with the formation of a precipitate of 2-chloro-3-ethoxy-2-tricyanovinylazetidine. Recrystallization of this product from ethylene chloride results in the formation of pure 2-chloro-3-methoxy-2-tricyanovinylazetidine.

*Analysis.*—Calc'd for $C_{10}H_9ON_4Cl$: C, 50.76%; H, 3.83%; N, 23.67%; Cl, 14.98%. Found: C, 51.39%; H, 3.97%; N, 23.98%; Cl, 14.89%.

The infrared absorption spectrum of this product shows absorption at 3.04 microns (NH), 4.53 microns (conjugated C≡N), 6.23 microns (conjugated C=C), and 9 microns (C—O—C).

EXAMPLE 11

*Preparation of 2-chloro-3-p-methoxyphenyl 2-tricyanovinylazetidine*

To a solution of 10.7 g. of 2-chloro-3,4,4-tricyano-1-trifluoromethylthio-1-aza-1,3-butadiene in 80 ml. of diethyl ether there is added 6.7 g. of p-methoxystyrene. A deep purple color forms upon mixing. Heat is evolved and the color fades after 5 minutes. The solution is then concentrated to a volume of approximately 25 ml. Filtration of the mixture yields 13.35 g. of crude solid product melting at 243–248° C. (dec.). Recrystallization of this product from ethylene chloride gives pure 2-chloro-3-p-methoxyphenyl-2-tricyanovinylazetidine, M.P. 262–263.5° C. (dec.).

*Analysis.*—Calc'd for $C_{15}H_{11}N_4OCl$: C, 60.30%; H, 3.71%; N, 18.75%; Cl, 11.87%. Found: C, 60.29%; H, 3.99%; N, 18.44%; Cl, 12.14%.

The infrared absorption spectrum obtained on this product is consistent with this structure. There is absorption at 3.14 microns (NH), 4.51 microns (conjugated C≡N), 6.26 microns (tricyanovinyl double bond), 6.58 microns (conjugated C=C) and 8.0 microns ($C_6H_5O$—). The ultraviolet absorption spectrum of this product in acetonitrile solution shows absorption at 230 millimicrons ($\epsilon$=15,500) and 269 millimicrons ($\epsilon$=19,400). The increased intensities for the p-methoxyphenyl and tricyanovinyl absorption suggest a spatial proximity of the substituents, i.e., a cis stereo-chemistry.

EXAMPLE 12

*Preparation of 2-chloro-3-(2-oxopyrrolidyl)-2-tricyanovinylazetidine*

A slurry of 10.8 g. (0.04 mole) of 2-chloro-3,4,4-tricyano-1-trifluoromethylthio-1-aza-1,3-butadiene in 50 ml. of diethyl ether is stirred at room temperature while 4.5 g. (0.04 mole) of N-vinylpyrrolidone is added dropwise.

The temperature rises until the mixture refluxes. A reddish solution forms and a tan solid is deposited. The mixture is cooled to room temperature and filtered and there is obtained 6.72 g. of crude adduct, melting at 220–225° C. Purification of this adduct is achieved by rinsing it with ethylene glycol dimethyl ether. The purified 2-chloro-3-(2-oxopyrrolidyl)-2-tricyanovinylazetidine has a melting point of 222–223° C. (dec.).

*Analysis.*—Calc'd for $C_{12}H_{10}ON_5Cl$: C, 52.28%; H, 3.66%; N, 25.41%; Cl, 12.86%. Found: C, 52.32%; H, 3.52%; N, 25.82%; Cl, 12.75%.

The infrared absorption spectrum of the product confirms the fact that the $CF_3S$— group has been removed during the reaction. There is absorption of the conjugated nitrile and the tricyanovinyl double bond as in the other azetidines. CF and $SCF_3$ absorptions are absent. Additional absorption due to NH and C=O is apparent. The ultraviolet absorption spectrum of the adduct in acetonitrile solution shows the presence of the tricyanovinyl group, $\lambda_{max.}$ 265 millimicrons ($\epsilon$=15,300).

The examples have illustrated the products and process of this invention by specific reference to the preparation of certain 2-chloro-2-tricyanovinylazetidines. However, this invention includes any azetidines of the formula:

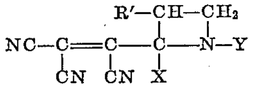

wherein the symbols have the meanings defined hereinbefore. Examples of other products having this general formula where Y is SR, and which can be prepared by the procedures described in Examples 1–6, inclusive, are listed in the following Table I, together with the specific 2-halo-3,4,4-tricyano-1-polyhaloalkylthio-1-aza-1,3-butadienes and specific olefinic compounds from which they are prepared.

TABLE I.—PREPARATION OF AZETIDINES

| Diene Reactant | Olefin Reactant | Azetidine |
|---|---|---|
| $(NC)_2C=C(CN)CBr=NSCF_3$ | $CH_3(CH_2)_9OCH=CH_2$ | 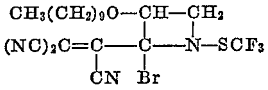 |
| $(NC)_2C=C(CN)CCl=NSCF_2CHFCl$ | $CH_3CH_2CH_2OCH=CH_2$ | 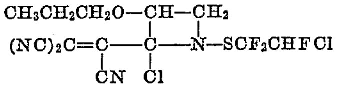 |
| $(NC)_2C=C(CN)CCl=NSCH_2CF_3$ | $C_2H_5SCH=CH_2$ | 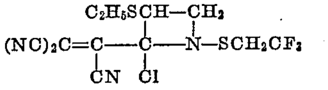 |
| $(NC)_2C=C(CN)CCl=NSCHClCCl_3$ | $C_2H_5OC_6H_4CH=CH_2$ | 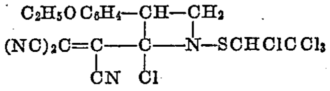 |
| $(NC)_2C=C(CN)CCl=NSCF(CF_3)_2$ | $CH_3OCH=CH_2$ | 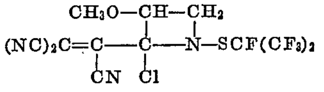 |
| $(NC)_2C=C(CN)CCl=NS(CF_2)_6CF_3$ | $C_2H_5OCH=CH_2$ | 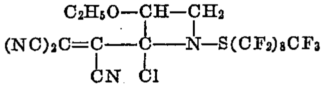 |
| $(NC)_2C=C(CN)CCl=NSCCl_3$ | 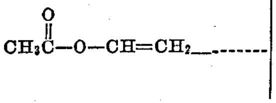 | 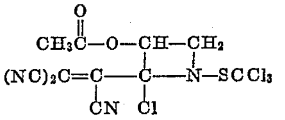 |

Similarly, other azetidines of the above general formula in which Y is hydrogen can be prepared from the specific 1-(polyhaloalkylthio)azetidines listed in the following Table II by reaction with the specific nucleophile listed in the second column of the table by the procedure described in Examples 7–9 inclusive.

TABLE II

| 1-(polyhaloalkylthio)azetidine reactant | Nucleophile reactant | Azetidine product |
| --- | --- | --- |
| 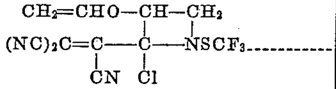 | $CH_3OH$ | 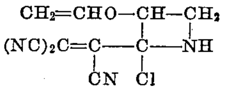 |
| 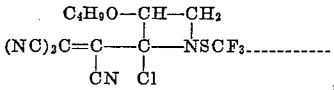 | n-$C_4H_9OH$ | 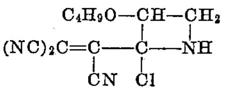 |
| 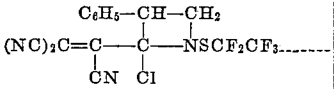 | $C_6H_5NH_2$ | 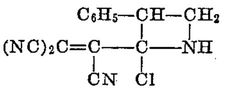 |
| 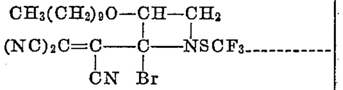 | $(C_2H_5)_2NH$ | 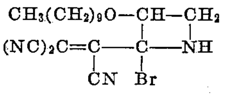 |
| 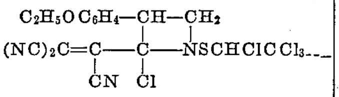 | $C_2H_5OH$ | 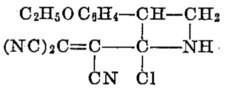 |
| 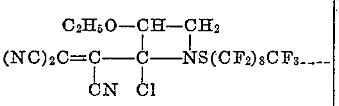 | n-$C_3H_7OH$ | 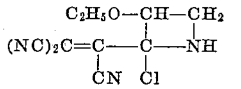 |
| 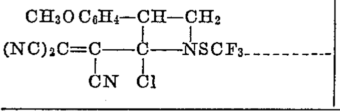 | NaI | 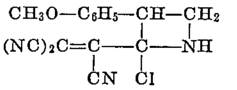 |

The products of this invention are useful for various purposes. They are particularly useful as water-repellants for cellulosic materials. The use of these products as water-repellants for paper is illustrated by the following Examples A and B.

EXAMPLE A

A saturated solution of 2-chloro-3-ethoxy-2-tricyanovinyl-1-trifluoromethylthioazetidine in acetone is prepared. Strips of filter paper are immersed halfway into this solution for 0.5 to 1 minute and the strips are then removed and allowed to dry in air. When water is placed on the dry strips, the water rolls off the portion of the paper which had been treated with the azetidine and does not penetrate to the opposite side of the paper. The untreated portion of the paper strip is wet through immediately by the water.

EXAMPLE B

A saturated acetone solution of 2-chloro-3-methoxy-2-tricyanovinylazetidine is prepared. Strips of filter paper are immersed halfway in this solution for 0.5 minute and then dried in air. After drying for 2 minutes, water is dropped on the paper. The water rolls off the treated portion of the paper and does not penetrate to the opposite side. The untreated portion in the paper is wet through immediately.

Since obvious modifications and equivalents in the invention will be evident to those skilled in the chemical arts, I propose to be bound solely by the appended claims.

The embodiments of the invention in which an exclusive property or privilege is claimed are defined as follows:

1. An azetidine of the formula

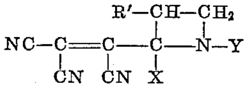

wherein

X is a member of the group consisting of chlorine and bromine;

Y is a member of the group consisting of hydrogen and —SR;

R is a polyhaloalkyl group of up to 10 carbons; and

R′ is a member of the group consisting of alkoxy, alkenyloxy, aryl, alkoxyaryl and alkylthio of up to 10 carbons, 2-oxopyrrolidyl and acetyloxy.

2. 2 - chloro - 3 - ethoxy - 2 - tricyanovinyl - 1 - trifluoromethylthioazetidine.

3. 2 - chloro - 3 - p - methoxyphenyl - 2 - tricyanovinyl-1-trifluoromethylthioazetidine.

4. 2 - chloro - 2 - tricyanovinyl - 1 - trifluoromethylthio-3-vinyloxyazetidine.

5. 3 - butoxy - 2 - chloro - 2 - tricyanovinyl - 1 - trifluoromethylthioazetidine.

6. 2 - chloro - 3 - phenyl - 2 - tricyanovinyl - 1 - trifluoromethylthioazetidine.

7. 2 - chloro - 3 - methoxy - 2 - tricyanovinyl - 1 - trifluoromethylthioazetidine.

8. 2 - chloro - 3 - p - methoxyphenyl - 2 - tricyanovinyl-azetidine.

9. 2 - chloro - 3 - methoxy - 2 - tricyanovinylazetidine.

10. 2 - chloro - 3 - ethoxy - 2 - tricyanovinylazetidine.

11. 2 - chloro - 3 - (2 - oxopyrrolidyl) - 2 - tricyanovinylazetidine.

12. The process of producing an azetidine which comprises reacting, at a temperature in the range of about 0–150° C.

(1) a compound of the formula

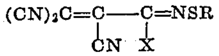

wherein X is a member of the group consisting of chlorine and bromine and R is a polyhaloalkyl group of up to 10 carbons, with (2) a compound of the formula $R'CH=CH_2$, wherein R' is a member of the group consisting of alkoxy, alkenyloxy, aryl, alkoxyaryl and alkylthio of up to 10 carbons, 2-oxopyrrolidyl and acetyloxy.

13. The process of producing 2-chloro-3-ethoxy-2-tricyanovinyl-1-trifluoromethylthioazetidine which comprises reacting, at a temperature in the range of about 0–150° C., (1) 2-chloro-3,4,4-tricyano-1-trifluoromethylthio-1-aza-1,3-butadiene with (2) ethyl vinyl ether.

14. The process of producing 2-chloro-3-p-methoxyphenyl - 2 - tricyanovinyl - 1 - trifluoromethylthioazetidine which comprises reacting, at a temperature in the range of about 0–150° C., (1) 2-chloro-3,4,4-tricyano-1-trifluoromethylthio-1-aza-1,3-butadiene with (2) p-methoxystyrene.

15. The process of producing 2-chloro-2-tricyanovinyl-1-trifluoromethylthio-3-vinyloxyazetidine which comprises reacting, at a temperature in the range of about 0–150° C., (1) 2-chloro-3,4,4-tricyano-1-trifluoromethylthio-1-aza-1,3-butadiene with (2) divinyl ether.

16. The process of producing 2-chloro-3-phenyl-2-tricyanovinyl-1-trifluoromethylthioazetidine which comprises reacting, at a temperature in the range of about 0–150° C., (1) 2-chloro-3,4,4-tricyano-1-trifluoromethylthio-1-aza-1,3-butadiene with (2) styrene.

17. The process of producing 2-chloro-3-(2-oxopyrrolidyl)-2-tricyanovinylazetidine which comprises reacting, at a temperature in the range of about 0–150° C., (1)

2 - chloro - 3,4,4 - tricyano - 1 - trifluoromethylthylthio-1-aza-1,3-butadiene with (2) N-vinylpyrrolidone.

18. The process of preparing an azetidine which comprises reacting, at a temperature in the range of about 0–150° C., (1) a 1-polyhaloalkylthioazetidine of the formula

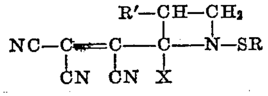

wherein:

X is a member of the group consisting of chlorine and bromine;

R is a polyhaloalkyl group of up to 10 carbons; and

R' is a member of the group consisting of alkoxy, alkenyloxy, aryl, alkoxyaryl and alkylthio of up to 10 carbons, 2-oxopyrrolidyl and acetyloxy, with (2) a member of the group consisting of alcohols and amines.

19. The process of preparing 2-chloro-3-p-methoxyphenyl-2-tricyanovinylazetidine which comprises reacting, at a temperature in the range of about 0–150° C., (1) 3 - chloro - 2 - p - methoxyphenyl - 2 - tricyanovinyl - 1-trifluoromethylthioazetidine with (2) a member of the group consisting of alcohols and amines.

20. The process of preparing 2-chloro-3-methoxy-2-tricyanovinylazetidine which comprises reacting, at a temperature in the range of about 0–150° C., (1) 2-chloro-3 - methoxy-2-tricyanovinyl-1-trifluoromethylthioazetidine with (2) a member of the group consisting of alcohols and amines.

No references cited.

NICHOLAS S. RIZZO, *Primary Examiner.*

UNITED STATES PATENT OFFICE
CERTIFICATE OF CORRECTION

Patent No. 3,203,950 August 31, 1965

Harris D. Hartzler

It is hereby certified that error appears in the above numbered patent requiring correction and that the said Letters Patent should read as corrected below.

Column 12, line 1, for "-trifluoromethylthylthio-" read -- -trifluoromethylthio- --.

Signed and sealed this 7th day of February 1967.

(SEAL)
Attest:

ERNEST W. SWIDER
Attesting Officer

EDWARD J. BRENNER
Commissioner of Patents